Jan. 23, 1945.   C. E. VALENTINE   2,367,979
FURNACE REGULATOR SYSTEM
Filed Dec. 8, 1942   2 Sheets-Sheet 1

WITNESSES:
C. J. Weller.

INVENTOR
Carroll E. Valentine.
BY
James N. Ely
ATTORNEY

Jan. 23, 1945.   C. E. VALENTINE   2,367,979
FURNACE REGULATOR SYSTEM
Filed Dec. 8, 1942   2 Sheets-Sheet 2

WITNESSES:
C. J. Weller.

INVENTOR
Carroll E. Valentine.
BY
James N. Ely
ATTORNEY

Patented Jan. 23, 1945

2,367,979

UNITED STATES PATENT OFFICE 2,367,979

FURNACE REGULATOR SYSTEM

Carroll E. Valentine, Forest Hills, Pa., assignor to Westinghouse Electric & Manufacturing Company, East Pittsburgh, Pa., a corporation of Pennsylvania Application December 8, 1942, Serial No. 468,235

6 Claims. (Cl. 314—74)

This invention relates to regulator systems, and particularly to regulator systems for governing the operation of the movable electrodes in electric furnaces.

In arc furnaces, the electrodes are disposed to be raised or lowered in response to predetermined conditions. Usually a motor is provided for effecting the raising or lowering of each electrode, the operation of the motor being controlled in response to the current flowing through the electrode and the potential across the arc. In general, such regulator systems are quite satisfactory.

However, where such current regulators are used in conjunction with a power source having a variable line voltage, then it is found that the power input changes with the line voltage, with the result that the changes in power are of about twice the magnitude of the voltage change. This phenomenon is found where the regulator employed operates on the impedance principle that there is a constant ratio between the voltage and the current. Although satisfactory for certain applications, in others, such as where it is desired to maintain a high load factor even though the line voltage varies, the known regulator systems are not satisfactory.

It is an object of this invention to provide a furnace regulator system which shall govern the operation of the movable electrodes to maintain a high load factor, although line voltage varies.

Another object of this invention is to provide a furnace regulator system so compensated for variations in line voltage of the power source as to maintain a high load factor at the electrodes of the furnace.

Figure 1:
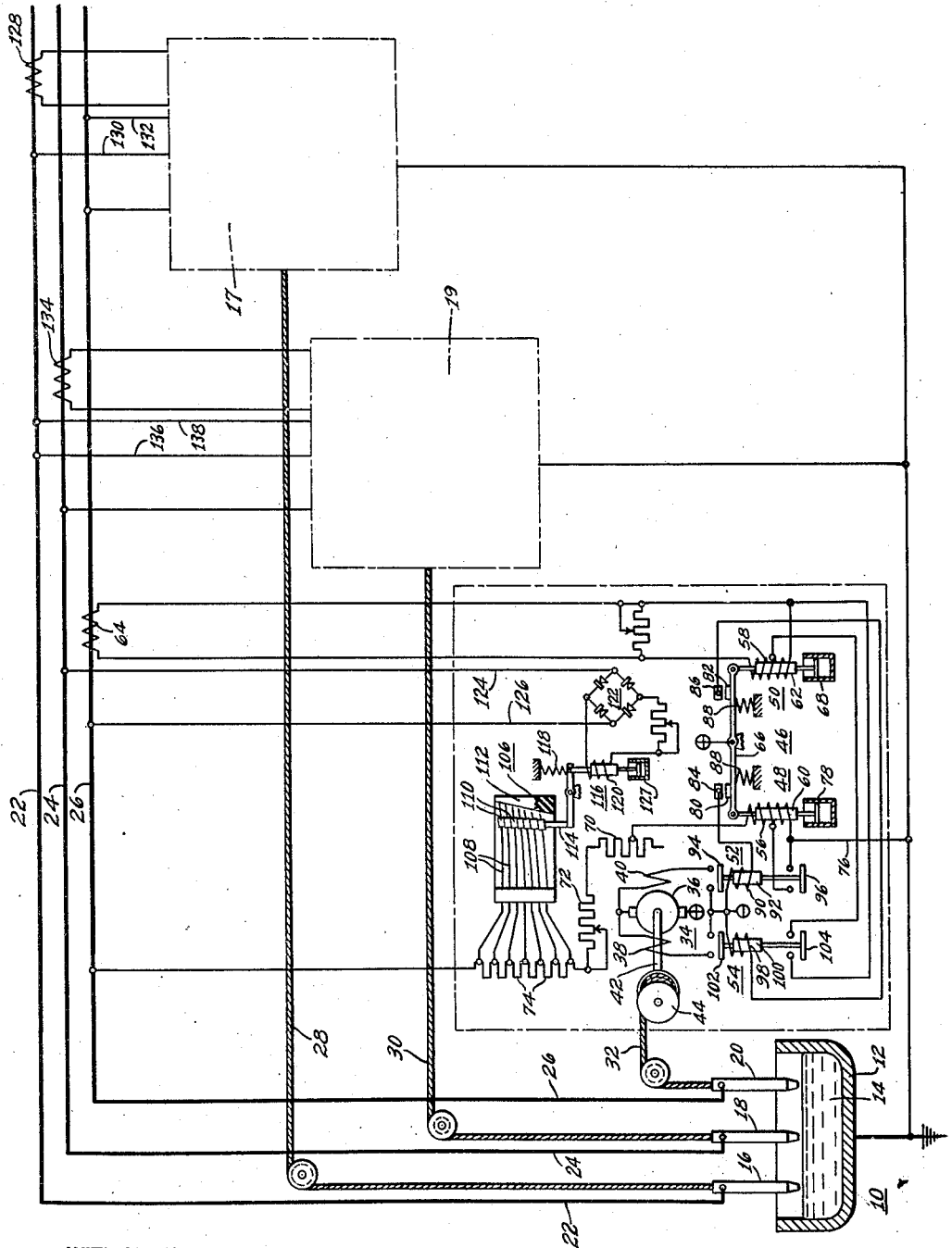
Figure 2:
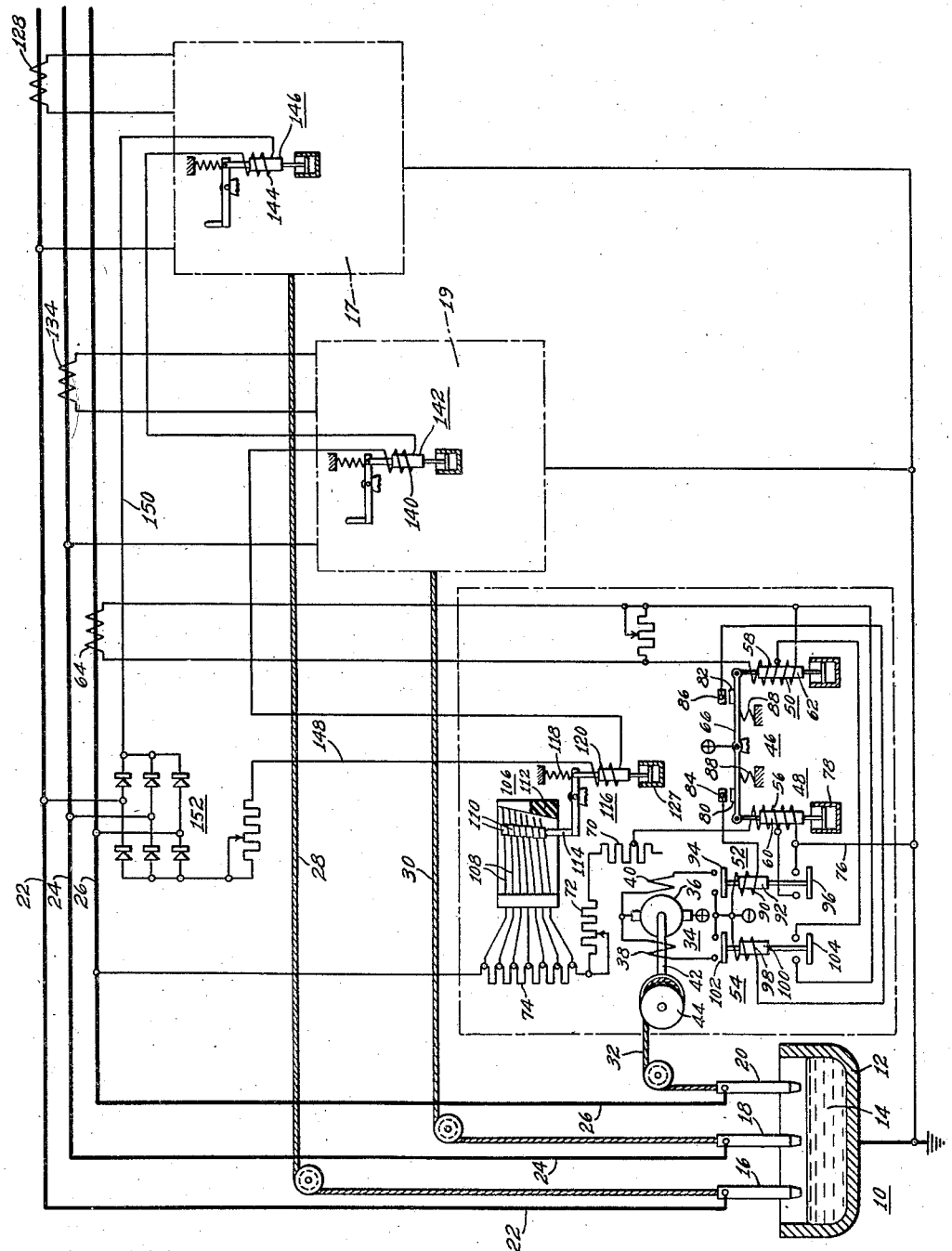

Other objects of this invention will become apparent from the following description when taken in conjunction with the accompanying drawings, in which:

Figure 1 is a diagrammatic view of a furnace regulator system embodying the teachings of this invention; and Fig. 2 is a diagrammatic view of another embodiment of the furnace regulator system of this invention.

Referring to the drawings, an electric furnace 10 is illustrated, the furnace comprising a receptacle 12 containing a bath of material 14 and three movable electrodes 16, 18 and 20. The movable electrodes 16, 18 and 20 are directly connected to a three-phase supply circuit comprising line conductors 22, 24 and 26, respectively.

Each of the movable electrodes 16, 18 and 20 is disposed to be raised or lowered by flexible cables 28, 30 and 32, respectively, by a motor, a regulator being provided for governing the operation of the motor in accordance with the current flowing through the electrode and the potential across the electrode arc. Since each of the regulators of the embodiment illustrated in Fig. 1 is of like construction and operates in the same manner, it is believed to be unnecessary to describe more than one of them. Accordingly, only the regulator associated with the electrode 20 is illustrated in detail and will be described, a motor and regulator therefor associated with each of the electrodes 16 and 18 being represented by the blocks 17 and 19, respectively.

In Fig. 1, a motor 34, comprising an armature 36 and field windings 38 and 40, is illustrated for raising and lowering the electrode 20. The armature 36 is mechanically connected to the electrode 20 in any suitable manner, or, as illustrated, by means of the shaft 42 which carries a winding drum 44 for receiving the flexible cable 32.

A regulator 46, which normally controls the operation of the motor 34, comprises two main control electromagnets 48 and 50, which are respectively operated in accordance with the potential across the arc produced by the electrode and the current flowing through the electrode 20, and two electromagnetic switches 52 and 54 which respectively serve to connect the motor across the positive and negative terminals of a constant power source to operate it in a counter-clockwise or a clockwise direction.

The main control electromagnets 48 and 50 comprise sectional energizing windings 56 and 58, respectively, and core armatures 60 and 62, respectively. The energizing winding 58 of electromagnet 50 is connected to the conductor 26 by means of a current transformer 64, the core member of the electromagnet being pivotally connected to the contact arm 66. A dashpot 68 is connected to the core 62 for retarding the speed and magnitude of travel of the core when violently accelerated beyond normal movement. The energizing winding 56 of electromagnet 48 is connected from one end through resistors 70, 72 and 74 to the conductor 26, and from the other end through conductor 76 to ground or the grounded receptacle 12 containing the bath 14. The core member 60 of electromagnet 48 is also pivotally connected to the contact arm 66 and is provided with a dashpot 78.

As illustrated, the contact arm 66 is pivotally mounted at a point intermediate the points of connection to the core members 60 and 62 and carries two main contact members 80 and 82 disposed in spaced relation for engagement with the spaced fixed contact members 84 and 86, respectively, according to the position of the contact arm 66. Springs 88 are connected to the arm 66 and are so disposed as to maintain the arm in a neutral, contact open, position when the electromagnets 48 and 50 are deenergized. The arm 66 and the contact members 80 and 82 are connected to the positive terminal of a constant source of supply (not shown).

The electromagnetic switch 52 comprises a winding 90, which is connected across the positive and negative terminals of the constant power source (not shown) when contact members 80 and 84 are engaged, and a core member 92 which operates two contact members 94 and 96. When actuated to a circuit closing position, contact member 94 completes a circuit from the positive terminal of the constant source of power through the armature 36 and field winding 40 of the motor 34, contact member 94, to the negative terminal to effect a rotation of the motor in a counterclockwise direction to lower the electrode 20 in the furnace. At the same time, contact member 96 closes a circuit to shunt the lower section of the energizing winding of electromagnet 48 and, in effect, decrease the energization thereof to provide anti-hunting characteristics to the regulator.

The electromagnetic switch 54 is similar to switch 52 and comprises a winding 98, disposed to be connected across the positive and negative terminals of the constant source of power (not shown) when contact members 82 and 86 are engaged, and a core member 100 which operates two contact members 102 and 104. Upon operation of the electromagnetic switch 54, contact member 102 connects the armature 36 and field winding 38 of motor 34 across the positive and negative terminals of the constant source of power to effect a rotation of the motor in a clockwise direction to raise the electrode 20 in the furnace. Anti-hunting characteristics for this operation are provided by the contact member 104, which closes a circuit to shunt the lower section of the energizing winding 58 of electromagnet 50.

The variable resistor 74 in circuit with the energizing winding 56 of potential electromagnet 48 is adjusted in accordance with the line voltage. As illustrated, a circuit controlling apparatus 106 of the type disclosed and claimed in Patent No. 2,246,301, issued June 17, 1941, to Hanna et al., and assigned to the assignee of this invention, is utilized for effecting the adjustment of the resistor 74.

The circuit controlling apparatus 106 comprises a plurality of leaf springs 108 of conducting material fixed at one end thereof and connected to taps along the resistor 74, the free ends of the springs 108 carrying contact members 110 and being self-biased to the open-circuit position to seat against a beveled or sloped stop 112. A driver member 114 of insulating material is disposed to be operated in accordance with the energization of electromagnet 116 against the bias of a spring 118 to effect the progressive operation of the leaf spring conducting members 108. The energizing winding 120 of electromagnet 116 is disposed to be energized in accordance with the line voltage, and is connected through the rectifier 122 and by conductors 124 and 126 to line conductors 24 and 26, respectively. A dashpot 127 is secured to the core of electromagnet 116 to stabilize its operation.

It is to be noted that the motor and regulator represented by the blocks 17 and 19 for the electrodes 16 and 18, respectively, are connected to be energized by a different phase voltage, the current electromagnet winding of the regulator of block 17 being connected to conductor 22 by a current transformer 128, with its adjusting electromagnet for the variable resistor, which is connected in circuit with the potential electromagnet, being connected by conductors 130 and 132 to conductors 22 and 26, respectively. Likewise the current electromagnet of the regulator of block 19 is connected to conductor 24 by the current transformer 134, the adjusting electromagnet for adjusting the resistor in circuit with the potential electromagnet being connected by conductors 136 and 138 to conductors 24 and 22, respectively. Thus, each of the motors and the regulators for controlling the operation thereof are connected to be responsive to a particular phase voltage.

In operation, assuming that the system is energized and the electrode 20 is positioned for normal operation of the furnace, the kva. load is substantially constant and a normal current flows through the electrode 20, a normal potential existing across the arc from the electrode 20 is the bath 14. Under such conditions, the electromagnets 48 and 50 are energized to effect a balanced pull on the arm 66.

If for any reason the current flowing through the electrode 20 is decreased below the normal value or the potential across the arc is increased, the energization of the winding 58 of electromagnet 50 is decreased, or the energization of the winding 56 of electromagnet 48 is increased to effect the engagement of contact members 80 and 84. The engagement of contact members 80 and 84 closes a circuit which extends from the positive terminal of the constant source of supply through the contact arm 66, contact members 80 and 84 and the winding 90 of electromagnetic switch 52 to the negative terminal to so energize the switch 52 as to actuate its contact members 94 and 96 to a circuit-closing position.

When the contact member 94 is in a circuit-closing position, a circuit is established which extends from the positive terminal of the constant source of power (not shown) through the armature 36, field winding 40 and the contact member 94 to the negative terminal to so operate the motor 34 as to effect a rotation of the motor in a counterclockwise direction. A counterclockwise rotation of motor 34 lowers the electrode 20 in the furnace to increase the current flow through the electrode.

At the same time that the contact member 94 of switch 52 closes the motor energizing circuit, contact member 96 also shunts the lower section of the energizing winding 56 of electromagnet 48 to decrease the energization thereof and tend to separate the contact members 80 and 84. However, because of the dashpot 78, a small time delay is effected before the contact members 80 and 84 are separated. This permits operation of the motor 34 to effect an adjustment in the position of electrode 20 at the same time providing anti-hunting characteristics to prevent an over-adjustment.

If power is supplied to the furnace from a source having a variable line voltage, the electromagnet 48 is compensated in accordance with a change in the line voltage to maintain substantially constant the load at the furnace. For example, if, during the normal operation of the furnace with the electrode 20 in a given position, the line voltage should increase, then the winding 120 of electromagnet 116 is so energized as to actuate the driver member 114 in a direction to effect a progressive separation of the contact members 110 to connect additional sections of the resistor 74 in circuit with the energizing winding 56 of electromagnet 48, and thereby, in effect, to so decrease the energization of the electromagnet 48 as to unbalance the magnetic pull of the electromagnets 48 and 50 on the contact arm 66. Under such conditions, the contact member 82 is actuated into engagement with contact member 86 to close a circuit which extends from the positive terminal of the source of power (not shown) through the contact arm 66, contact members 82 and 86, the energizing winding 98 of the switch 54 to the negative terminal of the constant source of power to operate the electromagnetic switch 54 to its circuit closing position.

When thus energized, the contact member 102 of the switch 54 connects the armature 36 and field winding 38 of motor 34 across the positive and negative terminals of the constant source of power (not shown) to operate the motor in a clockwise direction, and thereby raise the electrode 20 and, in effect, decrease the current flow through the electrode. Thus, for an increase in the line voltage, the electrode 20 is so positioned as to substantially maintain the kva. constant.

During the foregoing operation, it is, of course, to be noted that the contact member 104 of the switch 54 is also actuated to a circuit-closing position to effect shunting of the lower section of the energizing winding 58 of electromagnet 50 to decrease the energization thereof and tend to separate the contact members 82 and 86. However, the dashpot 68 functions to prevent immediate separation of the contact members 82 and 86, thereby permitting an operation of the motor 34 to effect an adjustment in the position of the electrode 20.

If, during the normal operation of the regulator 46 to effect an adjustment in the position of the electrode 20, that is, where the current flow through the electrode 20 is decreased from the normal current and the potential across the arc is increased so as to effect an operation of the contact arm 66 to effect a closing of the contact members 80 and 84 to operate the motor 34 in a counterclockwise direction, as described hereinbefore, the line voltage should vary, as described, then the increase in the line voltage would effect an operation of the adjusting electromagnet 116 to connect additional sections of the resistor 74 in circuit with the potential electromagnet 48 to tend to decrease the energization thereof to interrupt the operation of the motor 34. If such change in the line voltage is sufficiently great, then the electromagnet 48 is so deenergized as to effect the separation of the contact members 80 and 84 and an engagement of the contact members 82 and 86 to thereby operate the motor 34 in a clockwise direction to raise the electrode, as described hereinbefore. Thus the change in line voltage is cumulative with any change in normal operating conditions of the furnace for controlling the position of the electrode 20 to maintain a substantially constant kva. In the embodiment illustrated in Fig. 1, each of the electrodes 16, 18 and 20 are positioned in response to a change in the particular phase voltage, the operation of the regulator associated with one of the electrodes being substantially independent of the operation of the regulator associated with the other electrodes.

In the embodiment of the invention illustrated in Fig. 2, each of the electrodes 16, 18 and 20 is positioned in response to the operation of a motor and regulator therefor similar to the embodiment illustrated in Fig. 1. However, the energizing winding 120 of the adjusting electromagnet 116 for controlling the connection of the resistor 74 in circuit with the potential electromagnet 48 is connected in series circuit relation with the energizing winding 140 of an adjusting electromagnet 142 of the block 19 and the energizing winding 144 of adjusting electromagnet 146 of the block 17, so that each of the adjusting electromagnets is energized simultaneously with a change in the line voltage. As illustrated, the series-connected energizing windings of the electromagnets 116, 142 and 146 are connected by conductors 148 and 150 to the terminals of a three-phase rectifier 152, which is connected to the line conductors 22, 24 and 26. The electromagnets 116, 142 and 146 are so constructed that the inductance of the energizing windings effectively smooths any ripple of the rectified current which flows through their energizing windings.

In this embodiment, the regulator and motor associated with each of the electrodes 16, 18 and 20 function in the same manner as the regulator and motor described hereinbefore with respect to the positioning of electrode 20 of the embodiment illustrated in Fig. 1, with the exception that the potential electromagnets of each of the regulators are simultaneously compensated for any change in the average voltage of the polyphase voltage source of supply to the electrodes. This is readily appreciated when it is considered that the adjusting electromagnets 116, 142 and 146 are simultaneously energized to effect an adjustment in the resistor 74 which is connected in circuit with the energizing winding 56 of the potential electromagnet 48 of each of the regulators. Any change in the number of sections of the resistor 74 connected in circuit with the energizing winding 56 effects an operation of the regulator 46 in exactly the same manner as the same change affected the operation of the regulator 46 in the regulating system shown in Fig. 1. In other words upon a change in the polyphase voltage, such as an increase, each of the electromagnets 116, 142 and 146 is energized to so connect additional sections of an associated resistor 74 in the energizing circuit of electromagnet 48 of each of the regulators as to effect the operation of the motors associated with each of the electromagnets to rotate in a clockwise direction to raise each of the associated electrodes 16, 18 and 20 and thereby maintain substantially constant kva. regardless of the increase in the polyphase voltage of the power source.

By means of this invention, a more sensitive control of the positioning of the electrodes of the furnace and a more sensitive regulation of the operation of the electrode motor is obtained. Further, it is possible to maintain substantially constant kva., making it possible to more widely utilize the furnaces of the type referred to.

Although this invention has been described with reference to particular embodiment thereof, it is, of course, not to be limited thereto except in so far as is necessitated by the scope of the appended claims.

I claim as my invention:

1. In an arc furnace regulator system, a source of power supply having a variable line voltage, a movable electrode, means disposed for raising and lowering the electrode, a regulator comprising a current electromagnet energized in accordance with the current flowing through the electrode and a potential electromagnet energized in accordance with the potential across the electrode arc for operating the raising and lowering means, an adjustable resistor connected in circuit relation with the potential electromagnet, and means responsive to a change in the line voltage to adjust the resistor and vary the energization of the potential electromagnet in accordance with the change in the line voltage.

2. In an arc furnace regulator system, in combination, a source of power supply having a variable line voltage, a movable electrode, a motor disposed for raising and lowering the electrode, a regulator comprising a current electromagnet energized in accordance with the current flowing through the electrode and a potential electromagnet energized in accordance with the potential across the electrode arc for operating the motor, means connected in circuit relation with the potential electromagnet disposed to be operated to change the energization of the electromagnet, and means responsive to a change in the line voltage disposed to operate said first means to effect a change in the energization of the potential electromagnet in accordance with the change in the line voltage.

3. In an arc furnace regulator system, in combination, a source of power supply having a variable line voltage, a movable electrode, a motor disposed for raising and lowering the electrode, a regulator comprising a current electromagnet energized in accordance with the current flowing through the electrode and a potential electromagnet energized in accordance with the potential across the electrode arc for operating the motor, a sectionalized resistor connected in circuit relation with the potential electromagnet, a plurality of swiches disposed to be operated to control the connecting of the resistor sections in circuit with the potential electromagnet, and an electromagnet responsive to a change in the line voltage disposed to operate the switches to effect a change in the energization of the potential electromagnet in accordance with the change in the line voltage.

4. In an arc furnace regulator system, in combination, a source of power supply having a variable line voltage, a movable electrode, a motor disposed for raising and lowering the electrode, a regulator comprising a current electromagnet energized in accordance with the current flowing through the electrode and a potential electromagnet energized in accordance with the potential across the electrode arc for operating the motor, a sectionalized resistor connected in circuit relation with the potential electromagnet, a plurality of switches disposed to be operated to control the connecting of the resistor sections in circuit with the potential electromagnet, and means comprising a rectifier and an electromagnet connected in circuit with the power supply disposed to operate the switches to effect a change in the energization of the potential electromagnet as the line voltage changes.

5. In an arc furnace regulator system, in combination, a three-phase source of power supply having a variable voltage, a plurality of movable electrodes, a motor associated with each of the electrodes disposed for raising and lowering the associated electrode, a regulator associated with each motor, each of the regulators comprising a current electromagnet energized in accordance with the current flowing through an associated electrode and a potential electromagnet energized in accordance with the potential across the arc of the associated electrode for operating the motor associated therewith, an adjustable resistor connected in circuit relation with the potential electromagnet of each of the regulators, means including an electromagnet having an energizing winding associated with each of the resistors disposed for adjusting the associated resistor, the energizing windings of the adjusting electromagnets being connected in series circuit with each other, and a three-phase rectifier connected in circuit between the energizing windings of the adjusting electromagnets and the power supply to provide a rectified current for energizing the adjusting electromagnets in accordance with the variable line voltage of the power supply, the adjusting electromagnets thereby controlling the energization of the potential electromagnet of each of the regulators in accordance with the variable line voltage.

6. In an arc furnace regulator system, in combination, a three-phase source of power supply having a variable voltage, a plurality of movable electrodes, a motor associated with each of the electrodes disposed for raising and lowering the associated electrode, a regulator associated with each motor, each of the regulators comprising a current electromagnet energized in accordance with the current flowing through an associated electrode and a potential electromagnet energized in accordance with the potential across the arc of the associated electrode for operating the motor associated therewith, means connected in circuit relation with each of the potential electromagnets for controlling the energization thereof in accordance with the variable line voltage of the power supply, said means being connected in series circuit relation with each other to simultaneously effect a change in the energization of the potential electromagnet associated therewith, and means connected in circuit between the series connected controlling means and the power source to provide a unidirectional current for simultaneously operating the controlling means of each of the potential electromagnets in accordance with the variable line voltage of the power supply.

CARROLL E. VALENTINE.